(12) United States Patent
Paulsen, Jr. et al.

(10) Patent No.: US 6,704,698 B1
(45) Date of Patent: *Mar. 9, 2004

(54) WORD COUNTING NATURAL LANGUAGE DETERMINATION

(75) Inventors: Robert Charles Paulsen, Jr., Georgetown, TX (US); Michael John Martino, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/699,412

(22) Filed: Aug. 19, 1996

Related U.S. Application Data

(63) Continuation-in-part of application No. 08/212,490, filed on Mar. 14, 1994, now Pat. No. 5,548,507.

(51) Int. Cl.⁷ .......................... G06F 17/20; G06F 17/27
(52) U.S. Cl. ................................. 704/1; 704/9
(58) Field of Search ................. 707/531, 533, 707/535, 536; 704/1, 8, 9

(56) References Cited

U.S. PATENT DOCUMENTS

| | | | | |
|---|---|---|---|---|
| 4,610,025 A | | 9/1986 | Blum et al. | 382/177 |
| 4,773,009 A | * | 9/1988 | Kucera et al. | 707/351 |
| 4,829,580 A | | 5/1989 | Church | 704/260 |
| 5,062,143 A | | 10/1991 | Schmitt | 382/230 |
| 5,182,708 A | | 1/1993 | Ejiri | 704/1 |
| 5,251,131 A | * | 10/1993 | Masand et al. | 704/9 |
| 5,371,807 A | | 12/1994 | Register et al. | 382/159 |
| 5,392,419 A | | 2/1995 | Walton | 395/500 |
| 5,418,951 A | | 5/1995 | Damashek | 707/5 |
| 5,548,507 A | * | 8/1996 | Martino et al. | 704/1 |

FOREIGN PATENT DOCUMENTS

WO    WO 91/02347    2/1991

OTHER PUBLICATIONS

Dialog File 15, Acc. No. 01064897; John K. Courtis, "Readability of annual reports: Westerm versus Asian evidence", Accounting Auditing & Accountability Journal, vol. 8, No. 2, pp. 4–17 1995.*

* cited by examiner

*Primary Examiner*—Patrick N. Edouard
(74) *Attorney, Agent, or Firm*—Jeffrey S. LaBaw

(57) ABSTRACT

A technique for identifying a language in which a computer document is written. Words from the document are compared to words in a plurality of word tables. Each of the word tables is associated with a respective candidate language and contains a selection of the most frequently used words in the language. The words in each word table are selected based on the frequency of occurrence in a candidate language so that each word table covers an equivalent percentage of the associated candidate language. A count is accumulated for each candidate language each time one of the plurality of words from the document is present in the associated word table. In the simple counting embodiment of the invention, the count is incremented by one. The language of the document is identified as the language associated with the count having the highest value.

20 Claims, 6 Drawing Sheets

| ENGLISH | ITALIAN | DANISH |
|---------|---------|--------|
| the | di | i |
| of | e | og |
| and | che | at |
| to | la | - |
| - | il | - |
| - | si | - |
| - | é | - |
| - | in | - |
| - | un | - |
| - | a | - |
| - | - | - |
| - | - | - |
| - | - | - |
| - | - | - |

FIG. 3A

| LANGUAGE NAME | ACCUMULATED WORD FREQUENCIES |
|---------------|------------------------------|
| DANISH | 1376 |
| DUTCH | 1214 |
| ENGLISH | 3787 |
| SPANISH | 17 |
| etc... | ... |

FIG. 4

| DANISH | | DUTCH | | ENGLISH | | SPANISH | | etc. |
|---|---|---|---|---|---|---|---|---|
| WORD | NORMALIZED FREQUENCY OF OCCURRENCE (NFO) | WORD | NORMALIZED FREQUENCY OF OCCURRENCE (NFO) | WORD | NORMALIZED FREQUENCY OF OCCURRENCE (NFO) | WORD | NORMALIZED FREQUENCY OF OCCURRENCE (NFO) | ... |
| I | 100.0 | DE | 100.0 | THE | 100.0 | DE | 100.0 | ... |
| OG | 83.5 | VAN | 53.9 | OF | 52.0 | EL | 82.2 | ... |
| AT | 49.5 | EEN | 37.3 | AND | 41.2 | LA | 69.8 | ... |
| TIL | 49.4 | HET | 35.7 | TO | 37.4 | Y | 46.0 | ... |
| ER | 46.0 | IN | 35.5 | A | 33.2 | A | 43.2 | ... |
| EN | 42.1 | EN | 30.7 | IN | 30.5 | EN | 38.0 | ... |
| DET | 41.7 | IS | 17.6 | THAT | 15.1 | EL | 36.4 | ... |
| AF | 40.4 | TE | 16.4 | IS | 14.4 | QUE | 28.7 | ... |
| etc. | ... | ... | ... | ... | ... | ... | ... | ... |

FIG. 3B

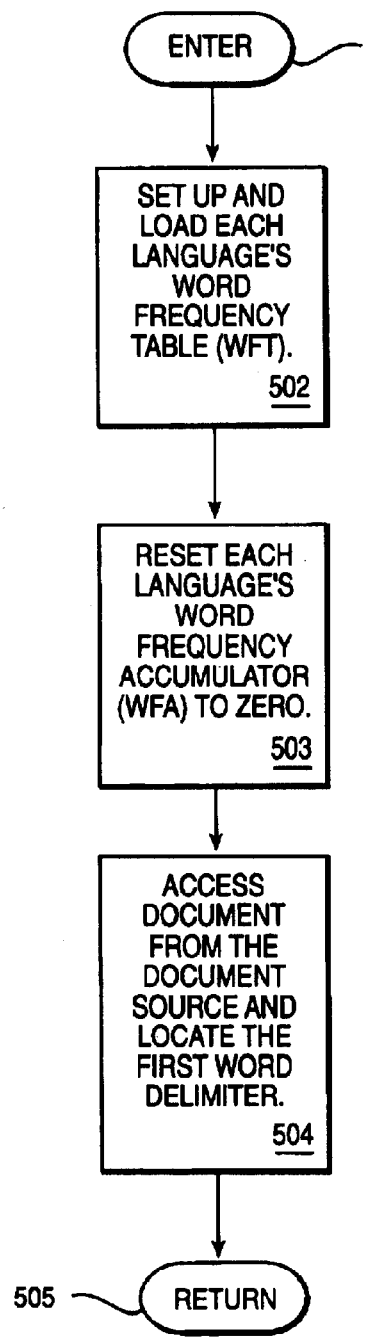
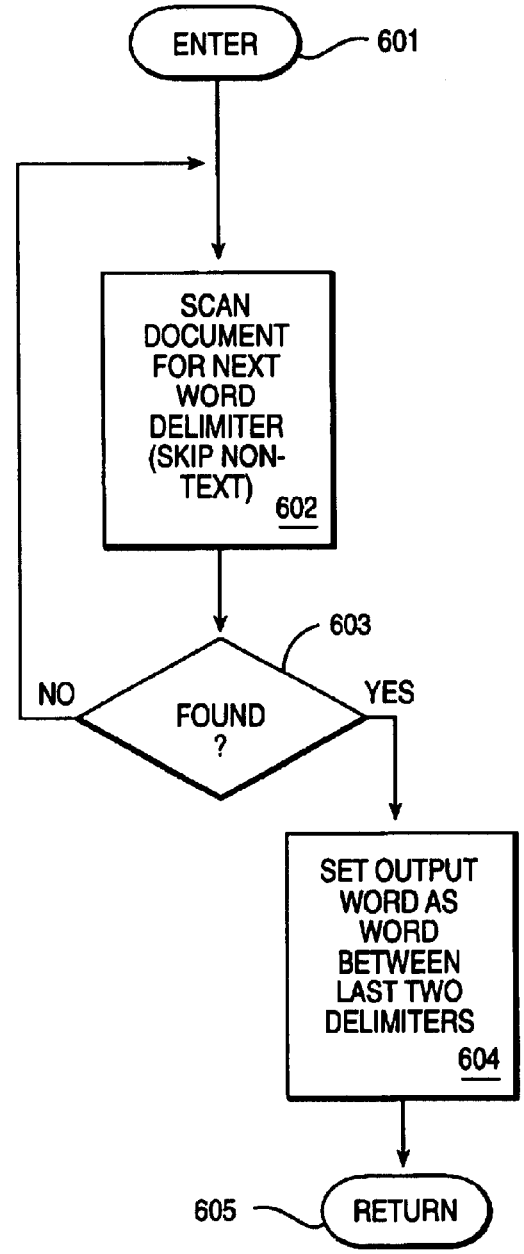
FIG. 5  FIG. 6

WORD COUNTING NATURAL LANGUAGE DETERMINATION

This application is a continuation in part of commonly assigned application entitled "Language Identification Process Using Coded Language Words", Ser. No. 08/212,490, filed Mar. 14, 1994 now U.S. Pat. No. 5,548,507 by the same inventors which is hereby incorporated by reference.

BACKGROUND OF THE INVENTION

The subject invention relates generally to human language recognition technology. More particularly, the invention relates to a technique for identifying the language used in a computerized document.

Computers and computer networks have intensified the transmission of coded documents between people who speak and write in different natural languages. The internet has recently accelerated this process. This results in several problems. In the prior art, for example, when an electronic document was sent across national boundaries, computer system operations were interrupted so that a human being could determine the natural language of a received document before a given operation such as selecting, displaying, printing, and so forth which may be dependent upon the peculiarities of an given natural language. In the context of an internet search, unless the user is multilingual, he is likely to be interested only in the retrieved documents in his native language.

The invention described herein eliminates the need for such human intervention by automatically determining the correct natural language of the computer recorded document.

Prior to the applicants' own contributions to the art, the general problem was recognized in the prior art. In the area of automated language identification of coded text, the prior art used n-gram character based systems, which handle each character multiple times, a process which consumes a great deal of system resource when compared to the applicants' word-based technique described below. In speech recognition systems, language recognition uses language and speech characteristics, e.g., trigrams or emphasis, which require large amounts of text to be parsed and measured, and large amounts of time for processing. These techniques are based on some form of matching algorithm based on language statistics that are not meaningful in a linguistic context.

Prior systems using trigrams, n-grams, and other artificial divisions in a computerized text are not considered reliable, and they are very slow and consume considerable computer time, as they handle each character multiple times for a document, e.g., each document character appears in three different trigrams. Characteristics measured, or derived from, but which are not actual components of written languages such as trigrams or letter sequences, have limited success in identifying the correct language, and require large amounts of text to be parsed and measured. Similarly, prior systems which depend on the attributes of individual characters and their local contexts are also limited when applied to the problem of identifying a language.

In the parent application and the invention described herein, none of the prior art techniques, e.g., classifying language by signal waveform characteristics, trigrams, n-grams, or artificial divisions of written language, were used. In both inventions, words are read from a computer document and compared to predetermined lists of words selected from a plurality of languages of interest. The word lists comprise relatively few of the most commonly used words in each language; statistically, a significant percentage of all words in any document will be the most common words used in its language. The language or genre of the document is identified by a process that determines which language's word-list most closely matches the words in the document. In the parent application, the closeness of match is determined by the weight of the normalized frequency of occurrence of listed words in each language or genre of interest. Each language's word-list and the associated frequency of occurrence for each word in the list is kept in a Word Frequency Table (WFT). The WFT is linked with a respective accumulator whose value is increased each time a word from an inputted document matches one of the common words in one of the tables. In the parent application, the process adds the word's Normalized Frequency of Occurrence (NFO), as found in the WFT, to the current sum in the accumulator associated with the respective language. When processing stops, the identified language is the language associated with the highest-valued accumulator. Processing may stop either by reaching the end of the document or by achieving a predetermined confidence in the accumulated discrimination.

In the invention which is the subject of this application and which is more fully described below, it has been determined that weighting in the accumulation process described in the parent application can be eliminated if the actual frequency of occurrence of words in each of the candidate natural languages can be established and word tables having a substantially equivalent coverage of the respective candidate languages assembled.

SUMMARY OF THE INVENTION

It is therefore an object of the invention to identify the natural language in which a computer stored document is written from a plurality of candidate languages in a most efficient manner.

This object and others are accomplished by a technique for identifying a language in which a computer document is written. Words from the document are compared to words in a plurality of word tables. Each of the word tables is associated with a respective candidate language and contains a selection of the most frequently used words in the language. The words in each word table are selected based on the frequency of occurrence in a candidate language so that each word table covers a substantially equivalent percentage of the associated candidate language. A count is accumulated for each candidate language each time one of the plurality of words from the document is present in the associated word table. In the simple counting embodiment of the invention, the count is incremented by one. The language of the document is identified as the language associated with the count having the highest value.

The speed of language determination by this invention is very fast, because only a relatively small number of words need to be read from any document to reliably determine its language or genre.

Further, an advantage of the present invention is that only a few words, e.g., 25–200, need be contained in the Word Frequency Table for each candidate language of interest, so that in practice each word is compared with only a relatively small number of words for reliable language recognition. As discussed below, it is important that the word selected for the words frequency tables for each language cover a commensurate percentage of the frequency of occurrences in their respective languages.

BRIEF DESCRIPTION OF THE DRAWINGS

FIGS. 3A and 3B are examples of Word Frequency Tables (WFTs) respectively containing a set of common words in a plurality of candidate languages.

FIG. 4 is an example of Word Frequency Accumulators (WFAs) respectively associated with the WFTs in FIG. 3B.

FIG. 5 is a flow chart of detailed initialization steps executed within step 202 in FIG. 2.

FIG. 6 is a flow chart of detailed steps executed within step 203 of FIG. 2 in a next word process for locating the words in a document having its language being determined.

DETAILED DESCRIPTION OF THE DRAWINGS

Figure 1:
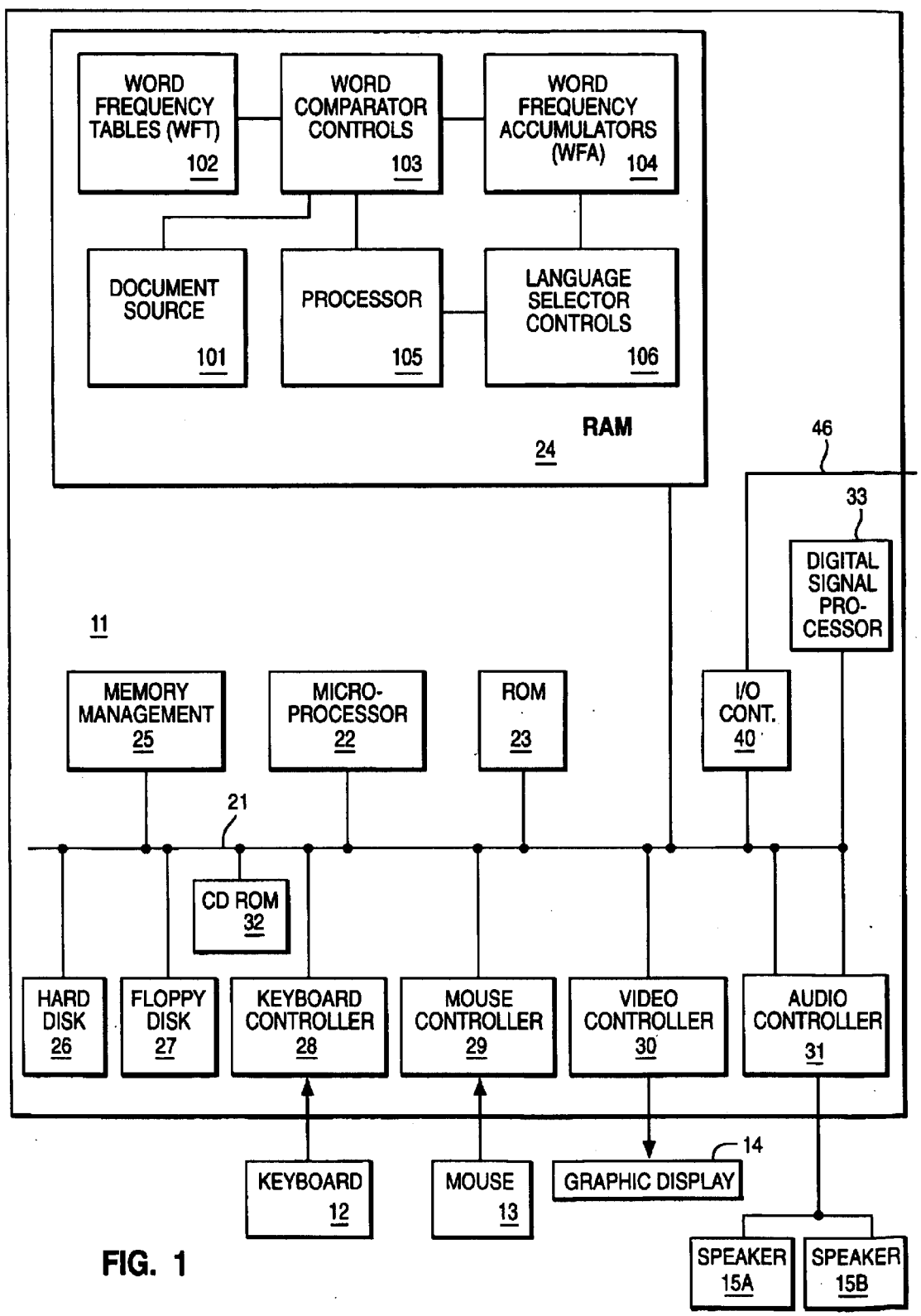
FIG. 1 is a functional block diagram of the current invention, a general data processing system containing data and controls for determining the language of a document.

In this specification, the term "language" means a natural language, i.e. human language, used for human communications, e.g., English, French, Spanish, German, and so forth. The term "language", as used in the claims, also applies to "genres" within a natural language. Genre is defined herein as a distinctive style of use of a language in some specific context. For example, genre within English includes technical writing, business writing, legal writing, medical writing, fiction, and many others. Thus, genre applies to different variations of the same language involving different styles and manners of word use within a natural language which are reflected in coded documents, and may involve a distinctive use of standard words in a language or may add new words to a language. Genre may reflect particular jargons and dialects of a language such as High German, Low German, and Swiss German, or as London English and New York English.

Ideographic languages such as Japanese, Chinese and Korean can be handled by this invention in a computer mechanism by choosing an appropriate internally-coded representation for the ideographs, such as the double-byte codes used for such languages in computers today. Thus, the mechanism of this invention can be applied to any language having coded words, without regard to the alphabet or word form required for the human-readable printed symbols used for the respective languages.

Generating the Word Tables

Conceptually, as well as temporally, the invention can be divided into two parts: the generation of the word tables, and language identification by the comparison of the words in incoming documents to the words in the word tables. In perhaps the most preferred embodiment, the word tables are the result of reference to scholarly works in which a large sample of words from the respective candidate languages have been counted. Once the word tables have been constructed, the actual determination of the language of an incoming computer document can begin, in either the simple counting, weighted or mixed identification methods described below. The word tables can simply be a list of the most common words or may include weights associated with the most common words. As described below, the weights can be computed in a variety of ways, although the applicants presently believe that the most preferred weight is as closely representative of the actual frequency of occurrence of the word in the language as possible.

In the parent application, it was taught that the measured or counted frequencies of occurrence of the most common words in representative samples of text for the different natural candidate languages should be used to create weighting factors or "normalized frequencies of occurrence" in the word frequency tables (WFTs) to provide best discrimination. In this continuation, the applicants assert that weighting is not required, and in fact provides no better discrimination, for nearly all documents of sufficient size, if the total percentages of use of words in each word list are approximately equal for each candidate language. Where simple counting is not sufficient, e.g., for very short documents, normalization in the present invention provides a weighting factor for each word that represents, as closely as possible, the actual frequency of use of that word in the language. The applicants also submit that other weighting factors such as the "normalized frequencies of occurrence" or NFOs as taught in the parent application will provide adequate discrimination in many applications. However, NFOs and other weightings are presently believed to be less preferred.

For many commonly used languages, the frequency of occurrence of words can be obtained from a number of different publications. For example, see the FREQUENCY DICTIONARY OF FRENCH WORDS, authored by A. Juilland, D. Brodin and C. Davidovitch, Mouton, The Hague, 1970, in the series, The Romance Languages and Their Structures. The most frequently occurring word in French is "le" and its measured frequency is 38,585 (page 387). "Que", according to the same source has, in French, a measured frequency of 9,570 (page 387). Similarly, in the FREQUENCY DICTIONARY OF SPANISH WORDS, in the same series of books, The Romance Languages and Their Structures, the most-frequently occurring word in Spanish is "de" and its measured frequency is 35,144 (page 385). Que, according to the Spanish frequency dictionary has a measured frequency of occurrence of 7,518 (page 385).

Other language data are found in FREQUENCY DICTIONARY OF ITALIAN WORDS, authored by A. Juilland, et al., The Hague, Mouton 1973, in the series, The Romance Languages and Their Structures, HYPPIGE ORD i DANSKE, Aviser, Ugeblade og Fagblade, av B. Maegaard og Hanne Ruus, Gyldendal, Copenhagen, 1986 (Danish), WORDFREQUENTIES IN GESCHREVEN EN GESPROKEN NEDERLANDS, P. C. Uit den Boogaart, Oosthoek, Scheltema & Holkema, Utrecht, 1975, (Dutch) A WORD-FREQUENCY DICTIONARY OF POLISH JOURNALISTIC TEXTS, F. E. Knowles, Dept. of Modern Languages, University of Aston, Birmingham, U.K., 1981 (Monograph), and FREQUENCY DICTIONARY OF CHINESE WORDS, E. S. Liu, Mouton, The Hague, 1973. Similar books have been published for essentially all major languages. This list is not exhaustive, but rather shows the breadth of languages for which the required frequency counts are readily available.

Table 1 below demonstrates why relatively few words are required to be in a Word Frequency Table. The data for Table 1 are taken from Computational Analysis of Present-day American English by H. Kucera and W. N. Francis and published by the Brown University Press, Providence, RI, 1967. It lists the twelve most common words in written English in MEASURED FREQUENCY order from top to bottom. The MEASURED FREQUENCY is stated as the average count for each common word per 100 words used in the (written) English language, determined over the total word count in a very large number of English documents. It is therefore the percentage of cases that a word randomly selected from a representative sample of written English text will be that particular word. MEASURED FREQUENCY is equivalent to frequency of occurrence, as that term has been previously used herein. Each CUMULATIVE FREQUENCY in Table 1 is the sum of the MEASURED FREQUENCIES for all words in the table from that point and above. For example, the CUMULATIVE FREQUENCY of 20.307 is shown with the word "in" in TABLE 1 and represents a plurality of common words comprising the six most frequently used words in the English language (i.e. the first six words: "the", "of", "and", "to", "a", and "in" in Table 1). The CUMULATIVE FREQUENCY of 20.307 is therefore derived by adding the MEASURED FREQUENCIES for these six words. Thus, in a representative sample of written English text, approximately 20% of the words in the text will be one of the first six words in Table 1; fully 26% will be one of the 12 words in the table. Thus, relatively few words represent a substantial portion of representative text. Similar tables showing similar statistics can be constructed for other languages.

TABLE 1

The Twelve Most Common English Words

| WORD | MEASURED FREQUENCY | CUMULATIVE FREQUENCY |
|---|---|---|
| the | 6.899 | 6.899 |
| of | 3.590 | 10.489 |
| and | 2.845 | 13.334 |
| to | 2.578 | 15.912 |
| a | 2.291 | 18.203 |
| in | 2.104 | 20.307 |
| that | 1.045 | 21.352 |
| was | 0.995 | 22.347 |
| he | 0.968 | 23.315 |
| for | 0.941 | 24.256 |
| it | 0.936 | 25.192 |
| with | 0.863 | 26.055 |

Language statistics, such as those shown above in Table 1, show that the words which are most common in a language are the most useful in making a language identification. The definition of a common word in a language is that it is a word that is used frequently in that language. As a result, common words from a language will appear in essentially all written communication; hence the process of this invention will find them.

When using scholarly references such as those cited above, one must be very careful that the same sort of information on each language is being used. It has been the applicants' experience that some of the references are not entirely clear as to the total sample size used for the word frequency determination. Some of the references, upon examination, list only partial samples. Some references may not have actually counted the entire sample, but made a partial count and used some algorithm to perform an estimate of the remainder of the words. The applicants have found that it is important to have equivalent word lists, both in terms of total coverage of each respective language and in terms of the "reliability" of the word frequency data. When a word list for one candidate language which has very good word frequency data, e.g., a million word sample wherein each word counted, is tested against a word list for another candidate language based on poorer knowledge of the language, the results will be skewed toward the candidate language whose word list is derived from the better data.

Normalization or other efforts to make the frequencies in the WFTs equivalent may be required because the sample sizes may be different from one language to the next, the sample sizes may be unknown, or the lists of the most common words taken from the samples may be different cumulative amounts of the different languages. Where one does not have the same amount of information of the same type for each language, normalization is generally a good idea. Where very good information is available for all of the candidate languages, normalization is not required.

Satisfactory results require that the data in the WFTs be commensurate. All word tables must reflect substantially equal frequencies of occurrence and where weights are used, the values for the weights should be equivalent from table to table. For example, if the value 100 associated with a word in one language's WFT indicates that the word constitutes 1% of all words encountered in documents written in that language, then the value 100 associated with words in the other languages' WFTs should indicate that those words constitute 1% of all words encountered in those respective languages. Furthermore, ratios of the weights, one to another, should indicate the same ratio of usage. A value of 200 in the same set of WFTs as the example above should indicate a 2% usage. Note that it is not the absolute magnitude of the values that are important, but the relative magnitudes of the values to each other.

In cases where the available data is not commensurate, the data needs to be normalized. Tables NORM1 through NORM4 illustrate a variety of normalization methods, depending on the nature of the raw data. They are based on hypothetical data. Only three languages are shown in each table, although many more candidate languages can be simultaneously evaluated according to the principles of the invention.

In TABLE NORM1, all the raw data is commensurate so no normalization is required. In TABLE NORM2, data for the different languages consists of usage counts for different sample sizes. In this case, the sample sizes are known, so the preferred normalization technique is to divide each count by the sample size. Since the sample sizes are known, the normalization process gives accurate values, to the extent that the raw data is accurate.

In TABLE NORM3, data again consists of usage counts, but the sample sizes are not known. In this case, the preferred normalization technique is to divide by the sum of the counts. Since there is incomplete data, this normalization process results in estimated values. This situation is not as desirable as the above, but experimentation has shown that very good results can be obtained given the assumption that the raw data represents a substantial coverage, e.g., 25% or more of usage of each language's vocabulary. Note that the parent application describes a different normalization technique in which each value was divided by the largest value in the respective WFT, and then multiplied by a common factor (in that case a factor of 100). This is shown in TABLE NORM4.

TABLE NORM1

This table assumes that all the data is commensurate, so no normalization is required.

| LANGUAGE | WORD | RAW VALUE | NORMALIZED VALUE (same as RAW DATA) |
|---|---|---|---|
| English | the | .068989 | .068989 |
| | of | .035900 | .035900 |
| | and | .028447 | .028447 |
| Italian | di | .029550 | .029550 |
| | e | .027082 | .027082 |
| | che | .018566 | .018566 |
| Danish | i | .030293 | .030292 |
| | og | .029755 | .029755 |
| | at | .018592 | .018592 |

TABLE NORM2

This table assumes that the raw data is based on different, but known, sample sizes. Normalization is accomplished by dividing each value by the sample size for the respective language. This gives results equivalent to that of TABLE NORM1.

| LANGUAGE | WORD | RAW VALUE | NORMALIZED VALUE |
|---|---|---|---|
| English | the | 69,971 | .068989 |
| (sample size | of | 36,411 | .035900 |
| 1,014,232) | and | 28,852 | .028447 |
| Italian | di | 14,475 | .029550 |
| (sample size | e | 13,541 | .027082 |
| 500,000) | che | 9,238 | .018566 |
| Danish | i | 22,114 | .030292 |
| (sample size | og | 21,721 | .029755 |
| 730,000) | at | 13,572 | .018592 |

TABLE NORM3

This table assumes the raw data is based on unknown sample sizes. Normalization is accomplished by dividing each value by the sum of all the counts for the respective language. This gives a less desirable, but often adequate result.

| LANGUAGE | WORD | RAW VALUE | NORMALIZED VALUE |
|---|---|---|---|
| English | the | 69,971 | .146593 |
| (sample size | of | 36,411 | .076283 |
| unknown) | and | 28,852 | .060446 |
| | all others in list | 342,081 | |
| | sum of counts in list | 477,315 | |
| Italian | di | 14,475 | .074081 |
| (sample size | e | 13,541 | .067894 |
| unknown) | che | 9,238 | .046545 |
| | all others in list | 161,844 | |
| | sum of counts in list | 199,433 | |
| Danish | i | 22,114 | .075740 |
| (sample size | og | 21,721 | .074394 |
| unknown) | at | 13,572 | .046484 |
| | all others in list | 234,564 | |
| | sum of counts in list | 291,971 | |

TABLE NORM4

This table assumes the data is based on unknown sample sizes. Normalization is accomplished by dividing each value by the highest value in the respective language and then multiplied by 100 as described by the parent application.

| LANGUAGE | WORD | RAW VALUE | NORMALIZED VALUE |
|---|---|---|---|
| English | the | 69,971 | 100.00 |
| (sample size | of | 36,411 | 52.04 |
| unknown) | and | 28,852 | 41.23 |
| Italian | di | 14,475 | 100.00 |
| (sample size | e | 13,541 | 91.00 |
| unknown) | che | 9,238 | 62.83 |
| Danish | i | 22,114 | 100.00 |
| (sample size | og | 21,721 | 98.22 |
| unknown) | at | 13,572 | 61.37 |

When preparing word tables for the simple word counting embodiment, it is not necessary to include weighting factors in the actual word tables as they are not used. In the simple word counting embodiment, described below, counting each occurrence of the common words selected for the word tables for each language is generally sufficient for discrimination among the candidate languages, rather than using weighted values for the words as taught in the parent application. Of course, the weights themselves add little additional storage requirement and if present in a word table, need not be used for simple counting. Alternatively, one could view the "weights" as being set to a constant value which will typically be 1.0.

To compute a Word Frequency Table (WFT) for the n most frequently occurring words in a given language or genre where the actual frequency of the words within the language is known, the following method can be used:

Step 1: Compute the total number of occurrences for each of the most common n words in each of the languages under consideration.

Step 2: Place each of the most frequently occurring words in each of the languages in the Word Frequency Tables and set the weight to 1 for each of the words.

Thus, the frequencies of occurrence in the simple counting method are merely used to set up the word lists in the WFTs to assure that the words in each have a substantially equivalent coverage of each of the candidate languages. FIG. 3A depicts portions of WFTs for English, Italian and Danish. Note that no weighting factor is included in the tables. For example, in English, 46 words are adequate to give an approximate 40% coverage, whereas in Italian, 148 words are needed.

It is not necessary to give exactly the same coverage in each language, nor is it necessary to use only the most frequently used words in descending order. It would be possible, if not preferred, to skip a word or two, if it were necessary to give a more equivalent coverage. Note, however, that unless all of the words ever written in a language were sampled, there will be some error in any sample used to generate the word lists. Deleting more frequently used words in the WFT in favor of common, but less frequently used, words is not generally the best idea for several reasons. Substituting one word for two or more words works counter to the principle of having the smallest possible dictionary. Near the end of a WFT that is, the less frequently used common words, there is not generally that much of a difference between the frequency of occurrence of the common words. The difference in frequency of occurrence may be within the error of counting, sample size, sample selection or normalization assumptions. However, where a common word appears in several candidate languages at nearly equivalent frequencies, the common word is not adding much to the process of discrimination. It may be a good idea to substitute a more frequently occurring common word which occurs in several languages for less frequently occurring words which do not. For practical purposes, exactly equivalent coverage in each language is not necessary to make the applicants, invention work.

As an alternative to the scholarly sources discussed above, the word frequencies for the words in each language or genre of interest may alternatively be determined by having a data processing system count the words in a large number of documents in an environment in which the invention is to be used. This approach may be more useful than using the listed sources when the particular environment mixes jargon, or colloquialisms, in one or more of the languages of interest, which often occurs, or if one is attempting to distinguish different genre in the same language. Performing the word counting oneself, allows one greater control over the sample size and counting method, assuring that they will consistent over the WFTs. Scholarly treatises may not be readily available for all candidate languages, particularly for lesser known languages. However, when performing the word counting oneself, one is doing without the advice of those experts in the respective languages who have made an attempt to collect samples which are representative of a cross section of works in the particular language.

Empirical studies conducted by the inventors have shown that counting the words recognized within each of the languages under consideration provides sufficient discrimination to determine the language of a given body of text in most cases. However, where small incoming documents are evaluated, the results returned by the recognition system may be inconclusive. The system may be designed for large documents where small WFTs in a large number of different languages would typically be adequate. Small WFTs are naturally more efficient in terms of system resources. In this case, the weighted counting or the mixed counting embodiments described below may be preferred. In the mixed embodiment, some combination of simple counting and weighted counting is used. The weights derived from actual or normalized frequencies are used, possibly in a second pass through the document, to help discriminate the language of the incoming target document. Naturally, if the actual frequencies of occurrence or normalized frequencies of occurrence are used in the language identification portion of the invention, they must be stored in the same or related WFT as the common words.

The use of the actual frequency of occurrence or the normalized frequency of occurrence as weights in the mixed embodiment has the potential in some cases to aid in discriminating among words which may appear in more than one language. The different weightings for the same coded word in different languages when summed in the respective accumulators differently affect the values being accumulated. For example, a word which is common to more than one language will ordinarily have different frequencies of occurrence in those languages and will therefore yield a different sum in the various language accumulators. Two examples of words which are common in different languages are "que" which is common in Spanish and French and "in" which is common in Dutch, English, German and Italian. However, the frequencies of occurrence in the respective languages differ. The word "in", while spelled the same in the standard alphabet, has different meanings, is a different part of speech, has different usages and so on in the various languages. "Que" is most commonly used as a conjunction in French, whereas in Spanish, the most common usage is as a pronoun. Using the different frequency of occurrence values within the different languages can be more effective than merely using the simple counting process.

As discussed above, the applicants have determined that if weights are to be provided in the WFTs that the frequencies of the common words should not be normalized by the frequency of the most common word as taught by the parent application, but rather should be normalized by the number of total words in the sample, or if that is not available, by the total number of words counted. Thus, the weights represent as close as possible the actual frequency of occurrence in the candidate languages. It should be noted that dividing by the total number of words in the sample was discussed in the parent application, as an alternative rather than best mode.

The other important change from the parent application is that the word lists should cover substantially the same percentage of the actual frequencies of words in the respective languages rather than have the same number of words in each word list. Both of these changes are geared toward making each dictionary more nearly equivalent.

A weighted Word Frequency Table (WFT) for the n most frequently counted words in a given language or genre can be computed. As discussed above, where the actual frequency of the words within the language cannot be reliably determined, the following method can be used:

Step 1: Determine a divisor. This is either the sample size, if known, or the sum of the counts of the n words in each word list.

Step 2: For each of the n words in each of the word lists for each of the given languages, divide its measured frequency of occurrence by the divisor from Step 1. Call this value the Normalized Frequency of Occurrence (NFO).

Step 3: Associate each Normalized Frequency of Occurrence (NFO) with the respective word in the Word Frequency Tables.

As above, in the description of preparing a word table for the simple counting method, there may be more words in the WFT for one candidate language than in the WFT for another candidate language and one or more most common words may be skipped in a given word list to obtain equivalent coverage over all WFTs.

The parent application taught that the frequencies of occurrence should be normalized producing normalized frequencies of occurrence (NFOs) by dividing the occurrence of the word by the frequency of the most common word in the language and multiplying by 100. While the applicants do not presently believe that this method is preferred, it will work, and is included to point out that a variety of weighting factors may be used with the present invention. As described in the parent application, the Word Frequency Table for a language or genre of interest may be generated by the following process:

1. Count the occurrence of each word in a large number of text documents for a language or genre to find the most commonly-used words which are selected and written in a list with their associated occurrence count.
2. Determine a frequency of occurrence for each word in the list by dividing the word's occurrence count by the total number of words examined in all documents by step 1 and replacing the occurrence count with the calculated frequency of occurrence.
3. Reduce the size of each word-list by selecting the N number of words in the list having the highest frequency of occurrence count. In practice, 25 to 200 words are sufficient for language discrimination, more are required for genre discrimination.

4. Normalize the frequency of occurrence for each word in the word-list by dividing the word's frequency of occurrence by the highest frequency of occurrence (designating the most-used word), or by dividing by the sum of all frequency of occurrence counts, in the respective word-list. Either of these methods obtains normalized-frequency of occurrence (NFO) values. The NFOs may be further adjusted by multiplying all NFO values by a common factor to achieve a more convenient scale. For example, multiplying by 100 so that the most-frequent word's NFO value is 100.

5. Use the selected words (step 3 and the associated NFO for each word (step 4) to comprise the Word Frequency Table for the language or genre. Thus, each of the Word Frequency Tables contains a set of the most frequently used words in a specific language or genre and values for the respective frequency of occurrence of each word in the language associated with that frequency table.

Thus, in the parent application, the most common word in each of the languages of interest has its NFO value set to 100 for each language, and the NFOs of the other common words in each table is less than 100. FIG. 3B depicts WFTs for Danish, Dutch, English and Spanish prepared in this manner.

As a variation on the invention, any of the Word Frequency Tables may also contain a sampling of words unique to the same language or genre which may have a relatively low frequency of use in the language of the respective table. Each of the common words in tables has an associated frequency value, as described above. However, each of the unique words in the tables has an artificial frequency value that is large in comparison to the frequency values of the common words. For example, a value twice that of the most common word may be used. Use of unique words may be especially helpful in distinguishing between genre.

The overall effect of these language statistics is that an examination of about 100–200 words from a document in an unknown language using the method of the present invention with the 25–200 most common words in each of the candidate languages and their normalized frequencies of occurrence is ordinarily sufficient to estimate the language of the document accurately. In the general case, the applicants try to achieve approximately 40 percent coverage of the language in the respective word tables. This can usually be achieved with less than 200 selected common words.

In fact, in many instances, fewer than 100 words need to be examined and still smaller word sets can be used in the WFT. For example, 25 most common words with often yield a satisfactory result if they represent a sufficient percentage of the total frequency of words in the respective languages and the candidate languages are relatively different sets of most common words. Some difficulty may be experienced with very short messages. However this is no different from what a skilled linguist is confronted with when asked in which language the message, "Die." written. Lacking any contextual clues or other words, the best guess is German as die has a very high frequency of occurrence in German, but Dutch and English are also candidate languages.

The probability of correctly identifying a language greatly increases for a language when a significant number of common words are examined in a document, and all of the counts are accumulated for the respective languages. Then, the language associated with the accumulator having the largest accumulated sum is the identified language for the document.

Therefore, if all the words read from a document provide the highest value in the French accumulator, the probability that the document is written in French is so great that it can be reliably used.

Language Identification

The preferred embodiment of the present invention is the combination of a novel computer program executing in a conventional data processing system. Alternatively, the invention may be embodied in special purpose data processing hardware (not shown) which has separate comparator controls for operating with tables embedded in special storage hardware. In the preferred embodiment, which the applicants call the simple word counting embodiment, the measured or counted frequencies of occurrence are used to assemble the tables but not using the weights for accumulation purposes. The word's frequency of occurrence within the word table for the given language is set to the actual percent occurrence of the word within the given language. As described below, the effect of simple counting is to replace the weighted accumulation process of the parent application by a counting method in which the values built up by the processing in the different language accumulators are in fact the counts of the number of occurrences of the common words in the WFTs of each of the candidate languages.

An alternate embodiment, called the mixed counting embodiment, uses some combination of simple counting and weighted counting. In a sequential pass embodiment, it will try simple counting first, and if the determination is inconclusive, will use weighted frequency data to attempt to perform a better discrimination. Simultaneous simple and weighted counting is also possible. If the discrimination does not reach some predetermined level of confidence in one counting method, the results from the second counting method can be evaluated. This embodiment may be useful where the input document whose natural language is to be determined is very short.

Among the advantages associated with the simple counting method are the simplification of data collection, in that simple counting of relatively small amounts of text will provide the word lists that are needed, and the ease of implementating the method in hardware and software, and elimination of the normalization requirement. Counting in hardware, that is, incrementing by 1 under one or more specified conditions, is fundamental to computing machines.

FIG. 1 shows an overall block diagram of a general system configuration supporting an embodiment of the invention. It contains components which may be formed of hardware and/or software components in the system. The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention running on the IBM OS/2 Warp 3.0 operating system.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 101–106 resident in the random access memory 24 of one or more computer systems configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. One skilled in the art would appreciate that the physical storage of the sets of instructions physically changes the medium upon which it is stored electrically, magnetically, or chemically so that the medium carries computer readable information.

While it is convenient to describe the invention in terms of instructions, symbols, characters, or the like, the reader should remember that all of these and similar terms should be associated with the appropriate physical elements. Further, the invention is often described in terms of comparing or identifying, or other terms that could be associated with a human operator. No action by a human operator is desirable in any of the operations described herein which form part of the present invention; the operations are machine operations processing electrical signals to generate other electrical signals.

As described herein, the invention applies for any language or genre using an alphabet without regard to the printed symbols used for that language. As a computer document, all such symbols are processed as binary codes in a computer machine, and rather than human readable symbols.

The data and logic blocks in RAM 24 are now discussed in greater detail. Coded data input is provided from a Document Source 101, which provides coded characters representing text of a document generated by using words of any human language. Before resident in RAM, document source 101 may be provided by an optical character reader reading the coded characters from a hard copy of a document. Alternatively, source 101 may be coded characters read from a soft copy of a document stored in an internal storage, e.g., floppy disk, tape or compact disk of the system, or source 101 may originate as coded characters transmitted on a network to the data processing system from some remote location using a similar system reading the document from one of its terminals or peripheral devices.

Each of the Word Frequency Tables 102 is associated with a respective language which can be detected as the language of source document 101. The construction of the Word Frequency Tables is as set forth above. In the pure counting method, weights such as the actual or normalized frequencies of occurrence are not required in the WFTs. In the weighted or mixed embodiments, the weighting factors, whether actual or normalized frequencies of occurrence or other weights, must be present in the word tables for each word. The set of particular languages represented by tables 102 are called herein the languages of interest, or candidate languages. A language not represented in tables 102 cannot be detected as the language of the incoming document source 101.

The text from the source 101 is provided in variable-length word units to the comparator 103. In a hardware embodiment, the comparator can be part of a processor. Comparator controls 103 compare each variable length word received from source 101 with each word in a plurality of language Word Frequency Tables 102.

Each word received from document source 101 is compared by the comparator 103 with the words in the tables 102. The comparator 103 determines an equal or unequal condition between each inputted document source word and each table word read from the word tables 102. The words in each of the plurality of the word tables 102 may be scanned until all words in all of the tables 102 are compared by the comparator 103.

When weights are used, whenever a word in any Word Frequency Table 102 is found to compare or equal to a source document word, the weight or the frequency value associated with the word is read out by the processor 105. Then, that frequency value is transferred by the processor 105 to a language-associated accumulator of a plurality of accumulators 104 which is the accumulator associated with the language of the table having the current word with the compare-equal condition and called a Word Frequency Accumulator (WFA). Each frequency value received by an associated Word Frequency Accumulator 104 is added to (accumulated with) whatever sum currently exists in the respective accumulator.

The compare processing stops when the source words stop being inputted. This may occur when the document source 101 reaches the end of the current document or reaches a predetermined number of words, i.e. some minimum number of words are supplied by the document source 101 or when the highest-valued accumulator 104 exceeds the next highest-valued accumulator 104 by a predetermined amount or factor. This is discussed below in connection with step 205 in greater detail.

After the compare processing stops for a document source 101, the language selector process 106 is queried by the processor 105. The language selector process 106 accesses all accumulated values in all accumulators 105 and determines which accumulator contains the highest value.

The language associated with the accumulator containing the highest value is outputted by the language selector 106 as the identified language.

A plurality of Word Frequency Accumulators (WFAS) 105 are respectively associated with each language's WFT. That is, each language has an associated WFT and at least one associated WFA. Thus, a WFT/WFA pair is thereby provided for each language of interest. The associated language is recorded with each WFA and each WFT. Examples of WFAs are represented in FIG. 4, which are respectively associated with the WFTs in FIG. 3B. All of the WFAs are reset to a zero value by initialization step 402 prior to inputting words from a document source 101 to the process in FIG. 1 or FIG. 2. In some embodiments of the invention, a plurality of accumulators are associated with each WFT, one for each word. This allows simultaneous weighted or simple counting in one mixed embodiment as the counts for each word can be multiplied by the respective weight or simply counted on a word per word basis. This is useful since the system does not always know the size of the target document. As mentioned above, weighted counting is felt to have the most use when the document is short. Thus, in one mixed counting embodiment, weighted counting is used until a predetermined number of words are compared. Thereafter, simple counting is used. By accumulating the word counts separately, the comparison process does not need to be reinitialized for a second pass through the document.

During processing, each WFA is incremented according to the common words in each language found in the document. In the simple counting method, a WFA contain a pure count of the common words. In the weighted and mixed embodiments, each WFA contains a running total of the weights of the common words in the source document which match a common word in the associated WFT for the same language. For each match of a word in the source document with a word in any of the WFTS, one or the weight for that word is added to the total for that language in the associated WFA.

Hence, each WFA sums the inputted words or the weights for inputted words having matches in the associated WFT. A match occurs when a source word from an inputted document is found equal to a word in the associated WFT. After reading is ended for an inputted document, the language assigned to the WFA having the highest value of all WFAs is thereby declared by the process as the identified language of the document.

Figure 2:
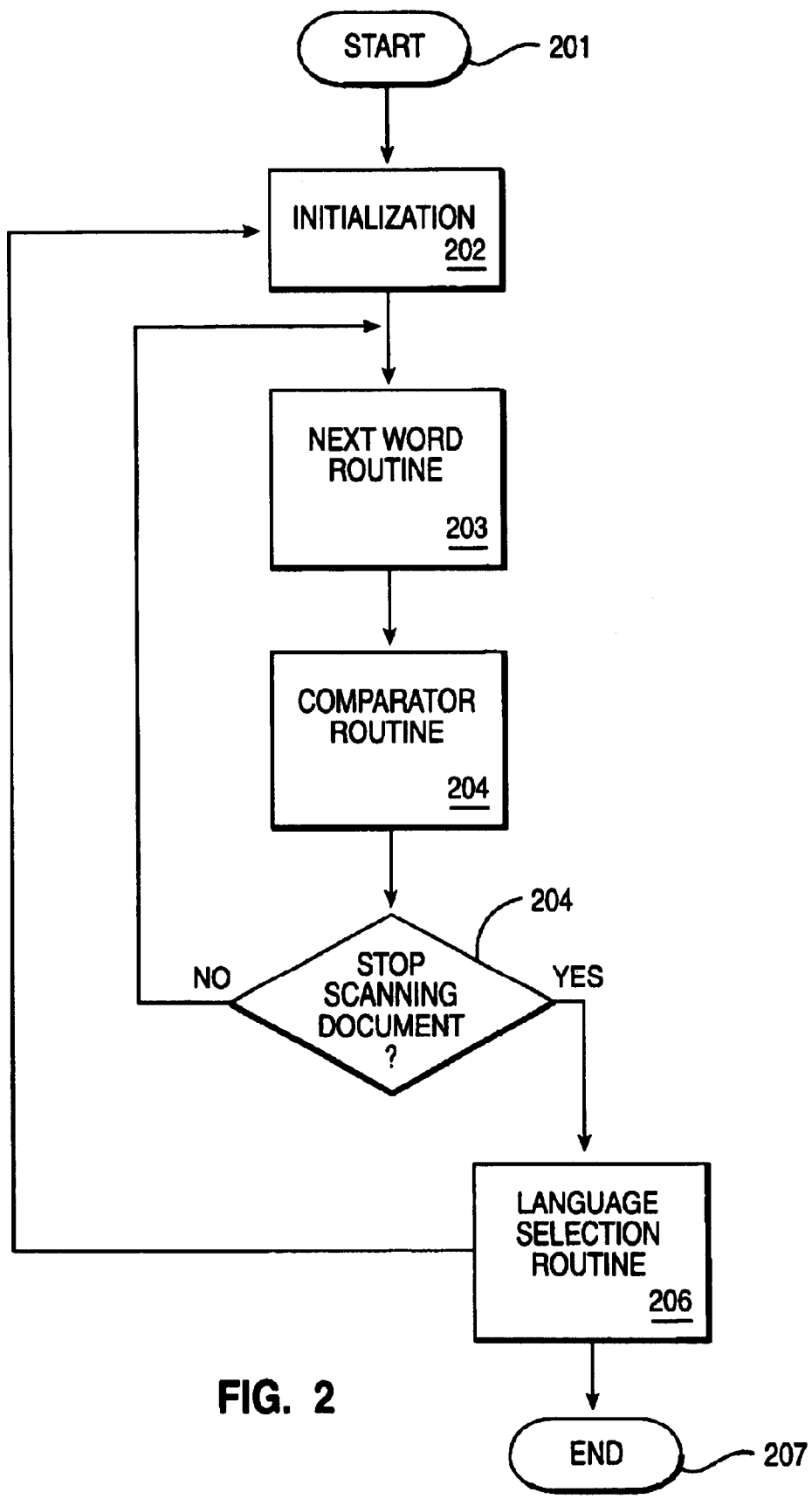
FIG. 2 is a flow chart of the sequence of general steps carried out in the process performed by the system shown in FIG. 1.

The process in the flow chart of FIG. 2 shows the general sequence of steps by which a document is processed and its language determined. The process is described here without reference to the use of unique words.

Each of steps 202, 203, 204 and 206 represents a subprocess, which is expanded into a sequence of substeps respectively represented in FIGS. 5, 6, 7 and 8. Each of these steps operates under control of a processor in the data processing system.

General step 202 provides initialization of a data processing system for executing the invention using WFTs and WFAs for the languages of interest. Step 202 loads the WFTs and WFAs into the system main memory from a storage medium, on which they were stored after they were previously prepared, and their addresses in main memory are passed to the process in FIG. 2 for use in its execution. Step 203 obtains the first word and a sequence of following words from the source document which is having its language determined and transfers each word to step 204. The first word need not be the actual first word in the document, and it may be located anywhere in the source document, and it is generally the first text word after any non-text data in the source document. Non-text data will generally be skipped in the sequence of data provided to the process in FIG. 2.

Step 204 compares each source word with all of the common words in all WFTS. In the weighted and mixed embodiments, step 204 reads out the weights associated with each matched common word. Step 204 adds one in the case of the simple counting method and the weight in the weighted counting method to the current sum in the WFA associated with the WFT.

Step 205 determines when to stop processing a document. This may be when any of the following conditions are detected:

1. The entire document is read and all words compared to the Word Frequency Tables. This may be determined by recognizing an end-of-document signal, by knowing the size of the document and tracking the amount of text processed, by sensing that a time has expired during which no input has been received as an indication of the end of a document, or by relying on the data processing system's file-processing subsystem to report end-of-file.
2. A predetermined number of words from the document have been processed. It has been found that only a hundred words or so may be needed from a document to identify its language. Thus, all words in a large document need not be read and processed by the subject invention. Hence, the invention may use a predetermined number N for the number of words required to be read for language or genre needing the most number of words for identification.
3. After some minimum number of words are processed, a predetermined factor or, alternatively, difference, between the highest-valued and the next-highest-valued accumulator is achieved. It has been found that once the accumulators diverge, it is extremely unlikely that additional processing will result in the then-highest-valued accumulator being exceeded by another accumulator when the entire document is processed.

Step 206 is entered after the end of document is sensed by step 205. Step 206 compares the values in all of the WFAs and finds the WFA having the largest value. Step 206 outputs the language name content of the language field associated with the WFA having the largest value to determine the identified language. In the case of the sequential pass mixed embodiment, it also includes a test to determine whether the specified amount of discrimination has been achieved. If not, the process returns to step 202 to be initialized for the second weighted counting pass.

FIG. 5 shows steps for the initialization process 202 in FIG. 2, which is entered when the process in FIG. 2 is started. Thus, in FIG. 5, step 501 is entered from step 201 in FIG. 2. Step 502 sets up and loads into the main storage of the data processing system the WFT and WFA for each language of interest to be used in the execution by the process of FIG. 2. Preferably, the WFTs and WFAs were previously prepared and stored on a disk device in the manner discussed above in this specification. Hence, step 502 loads the WFTs and WFAs from the disk device into a main storage of a data processing system and sets up their main storage addresses within software for the process in FIG. 2, in the manner done by conventional software initialization processes.

After step 502 is completed, step 503 sets the contents in all WFA accumulators to a zero state. Then, step 504 accesses the input source document and locates and reads its first word. Each word in a coded document is delineated by conventional word delimiters. Such delimiters are primarily "blank" characters, but also include the comma (,), semicolon (;), period (.), question mark (?), and other punctuation marks in each of the languages of interest.

The initialization operation in FIG. 5 may then end at step 505 with a return to the main-line process in FIG. 2, in which step 203 is entered.

FIG. 6 shows the next word routine from FIG. 2 in greater detail. Step 203 in FIG. 2 is executed by entering step 601 in FIG. 6. Then step 602 is invoked to scan the characters received from the document in order to delineate its words, which are needed by the process of this invention. Each next source word is determined by detecting a next word delimiter which initially is just prior to the beginning of first word in the source document, which is detected by step 603.

As the characters are received, they are stored into a word buffer W and the storing of characters stops momentarily when the next word delimiter is detected, to define the next word in buffer W; this word is then referred to herein as the "current word". The process in FIG. 6 defines one current word at a time from the source document, and then step 605 returns to the main-line process in FIG. 2 by entering step 204.

The effect of this delimiter processing is to parse the source document into its words and present each source word to the comparator process 204 in FIG. 2.

Figure 7:
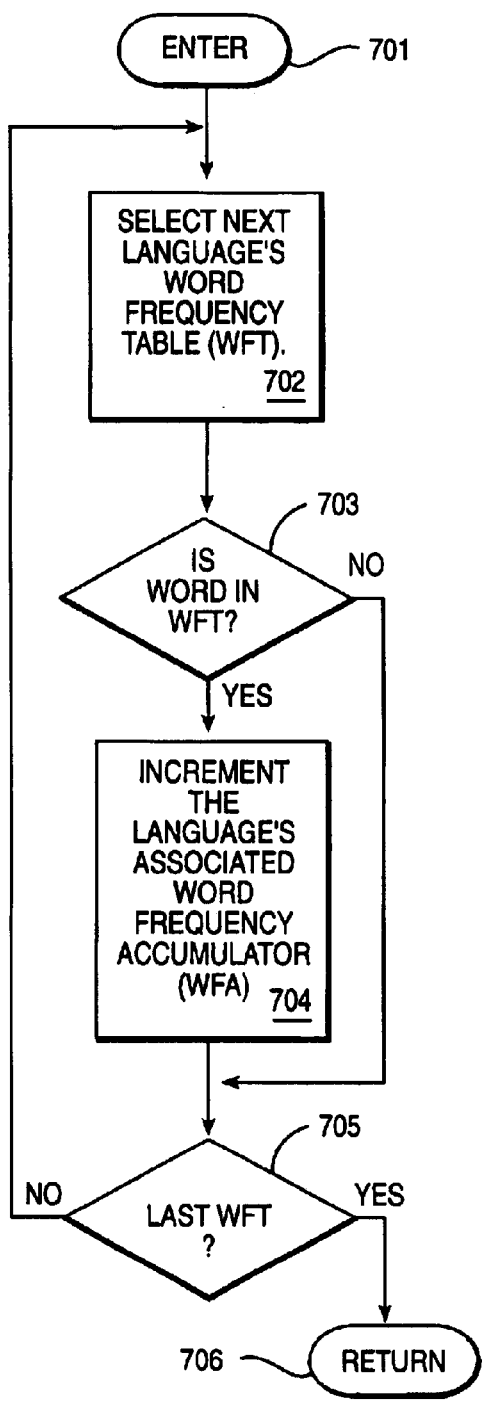
FIG. 7 is a flow chart of detailed steps executed within step 204 of FIG. 2 in a comparator process for identifying common words in a document and incrementing their associated WFAs of the languages of interest.

The comparator process depicted in FIG. 7 receives each current word from buffer W and compares it with each common word in all WFTs, beginning with a first selected WFT in the set of WFTs of the candidate languages. Step 702 starts by selecting the first WFT in the set which can be any of the WFTs in the set. Then the WFTs can be selected in any order until all are compared to the received source word. Thus, step 702 may select, for example in FIG. 3B, the Danish WFT as the first WFT.

Step 703 then compares the current word with the common words in the WFT to determine if the current word is present in that language's table. If the current word is not in that table, the no exit is taken from step 703 to step 705 which indicates if the current WFT is the last WFT to be examined in the set. If this WFT is not the last in the set of WFTS, the no exit is taken from step 705 back to step 702, which then selects the next WFT in the set for a next iteration through the sub-process in FIG. 7.

If step 703 finds a compare-equal condition, then the yes exit is taken to step 704 which accesses the NFO with the WFT word having the hit and adds that NFO to the current sum in the associated WFA for that language for the weighted counting routines. In the simple counting embodiment, the WFA is incremented by one. Then, step 705 is entered to test if the current WFT is the last. If not the last WFT, the no exit is taken to step 702, and another iteration through the process in FIG. 7 is taken until all WFTs are compared to the same source word.

The effect of the process in FIG. 7 is to generate for all of the languages of interest, accumulated totals in the WFAs for hit source words. When the last WFT in the set is compared, step 705 takes its yes exit to step 706 which returns the process operations to step 205 in the main-line process in FIG. 2 to determine if the current source word is the last word to be examined in the source document.

Thus, the current source word may not be found in any WFT, or it may be found by step 703 to be in one or more WFTs for one or more of the languages of interest, whereby on or its associated weights may be added to the contents of one or more WFAs.

Figure 8:
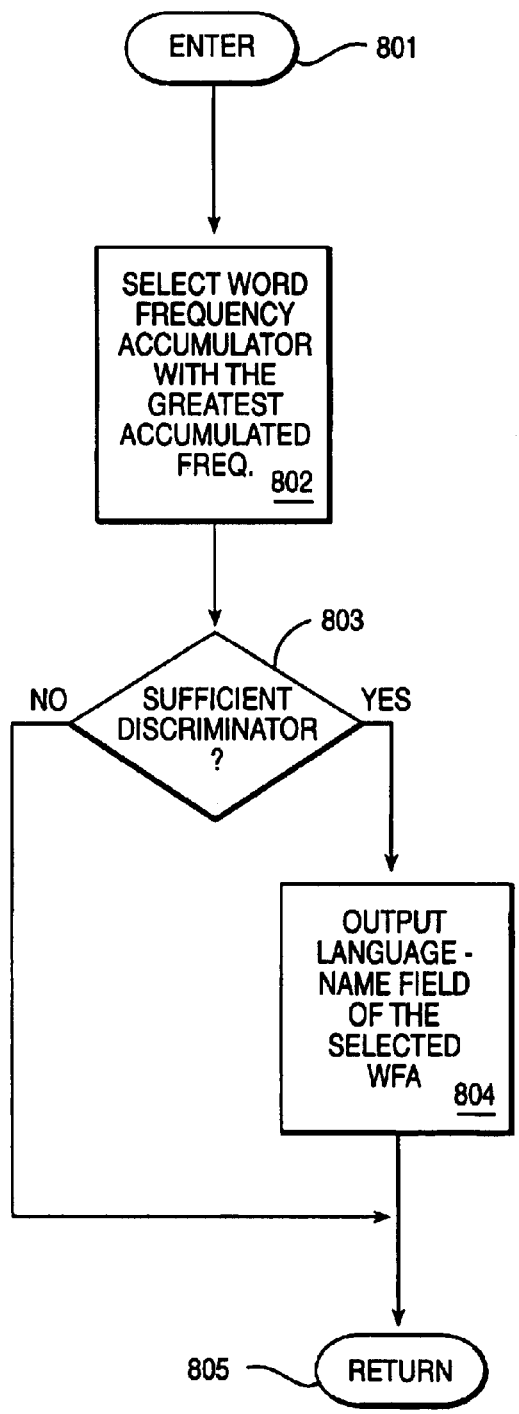
FIG. 8 is a flow chart of detailed steps within step 206 of FIG. 2 for a language selection process which identifies the human language of a source document based on the highest sum in any WFA.

The language selection routine is shown in greater detail in FIG. 8. Step 206 selects the language associated with the WFA having the largest total, which is thereby identified as the language of the source document. The processing for step 206 begins by entering step 801, which goes to step 802 to measure all of the values in the WFAs to determine the largest value. In one of the mixed counting embodiments, multiple passes through the document are envisioned. Because of the speed of the simple counting embodiment, and because it is rare that the language of a document can not be effectively identified using the method, the system designer may be willing to "gamble" that the additional overhead of sets of WFAs and weights of the simultaneous mixed counting embodiment and so forth are unnecessary. When the gamble proves wrong, recovery may be made in second weighted pass. In this embodiment, a test, e.g., size of accumulated counts in highest WFA or degree of divergence in the WFAS, is made in step 803 to determine whether the degree of discrimination in the first pass using simple counting is sufficient. As discussed above, for short documents, it is possible that the simple counting method may not prove sufficient. If the discrimination is not adequate, the process will return to step 202 to be initialized for the second, normalized pass. For the other embodiments, when step 802 determines the largest value in all of the WFAs, step 804 is executed to access the language-name field associated with the WFA containing the highest value, and the language name content of that field is outputted to indicate the identified language for the current source document. The process in FIG. 8 is then complete, and its next step is taken to return to the main-line process in FIG. 2, which then ends with its last step 208.

If a next source document exists, the process in FIG. 2 is repeated for determining its language.

Experiments have shown that after about 100 to 200 words are read from a document being examined to determine its natural language, the identification of the correct language is given by the highest sum in the accumulators for the candidate languages. It is preferable that several hundred words be read from a document, unless it is a very short document, to conclude that the language identification is assured with a high degree of confidence. For short documents, the language assurance is less, but generally is sufficient.

As an aside, cryptographers have known for a long time that common words can provide an opponent with an entry into a code or cipher. In certain situation then, messages are encoded or enciphered avoiding the common words. This fact provides an independent confirmation of the usefulness of common words in the determination of the language of a document.

It can be argued that uncommon words are actually a better discriminator among languages and while true, it is not a particularly useful observation. For example, "undoubtedly" occurs only (so far as is known to the inventors) in English, and hence may be taken as an absolute indication that a document containing it is written in English. However, the word "undoubtedly" occurs so infrequently, as to be of no value in discriminating among languages. Using large tables of uncommon words will increase discrimination (either alone or in combination with common words). Uncommon word tables for languages of interest are intended to be included in the concept of this invention, so that if all the words in a given document are found in a table of uncommon words of one language, L, it is assured that the document is written in language L.

While the invention has been shown and described with reference to particular embodiments thereof, it will be understood by those skilled in the art that the foregoing and other changes in form and detail may be made therein without departing from the spirit and scope of the invention.

We claim:

1. A method for identifying a language in which a computer document is written, comprising the steps of:

comparing a plurality of words from the document to words in a plurality of word tables, each word table associated with and containing a selection of most frequently used words in a respective candidate language;

accumulating a respective count for each candidate language each time one of the plurality of words from the document is present in the associated word table; and identifying the language of the document as the language associated with the count having the highest value.

2. The method as recited in claim 1, further comprising the step of selecting the words in each word table based on frequency of occurrence in a candidate language so that each word table covers an equivalent percentage of the associated candidate language.

3. The method as recited in claim 2, further comprising the step of storing the frequency of occurrence of each word in a respective candidate language in the word table for the respective candidate language.

4. The method as recited in claim 3, wherein the accumulating step comprises the steps of:
associating each word table with a respective set of accumulators, each accumulator in the set of accumulators for counting the occurrences of a respective word in the word table; and
summing the counts in each set of accumulators once the plurality of words have been compared to the word tables.

5. The method as recited in claim 4, further comprising the steps of:
multiplying a total count of each word in a respective accumulator by the stored frequency of occurrence for the word in the word table to produce a set of weighted counts;
summing the set of weighted counts to produce an aggregate weighted count once the plurality of words have been compared to the word tables; and
identifying the language of the document as the language associated with the aggregate weighted count having the highest value.

6. The method as recited in claim 1 wherein the plurality of words represent a subset of the total number of words in the document and the method further comprises the steps of:
counting the plurality of words as each of the plurality is compared to the words in the word tables; and
responsive to the count of the plurality of words reaching a predetermined number, stopping the comparing and accumulating steps.

7. The method as recited in claim 5, further comprising the steps of:
counting the plurality of words as each of the plurality is compared to the words in the word tables;
using the identified language according to the aggregate weighted count as the identified language of the document as long as the count of the plurality of words is less than a predetermined number; and
using the identified language according to the count as the identified language once the count of the plurality of words reaches the predetermined number.

8. A system including a processor for identifying a language in which a target computer document is written, comprising:
a memory for storing the target document and a plurality of word tables, each word table associated with and containing a selection of most frequently used words in a respective candidate language;
a comparator for comparing a plurality of words from the document to words in the word tables;
a set of accumulators for accumulating a respective count for each candidate language by one each time one of the plurality of words from the document is present in a word table, each accumulator associated with a respective word table; and
a language identifier for identifying the language of the target document as the language associated with the count having the highest value.

9. The system as recited in claim 8 further comprising:
means for scanning a plurality of documents in each candidate language;
means for counting each of a plurality of words in the documents to establish a frequency of occurrence value for each word in each candidate language;
means for storing candidate words having a frequency of occurrence value exceeding a threshold value in each candidate language; and
means for selecting among the candidate words and storing the selected words to form word tables for each of the candidate languages so that each word table covers a substantially equivalent percentage of the associated candidate language.

10. The system as recited in claim 9 further comprising means to associate the frequency of occurrence value with the selected words in each of the word tables.

11. The system as recited in claim 8 wherein special words which occur in only one candidate language are included in a respective word table and wherein when the comparator detects a special word in the target document greater weight is given in the accumulated count for the respective candidate language.

12. The system as recited in claim 8 which stops once a predetermined number of words from the target document are compared to the words in the word tables.

13. The system as recited in claim 8 which stops once a predetermined amount of divergence is detected in the set of accumulators.

14. The system as recited in claim 8 wherein a predetermined minimum number of words from the target document must be compared before identifying the language of the target document.

15. A system comprising a memory and a processor for identifying a language in which a computer document is written, wherein a plurality of words from the document are compared to words in a plurality of word tables, each word table associated with and containing a selection of most frequently used words in a respective candidate language, a respective weighted count is accumulated for each candidate language each time one of the plurality of words from the document is present in the associated word table, and identifying the language of the document as the language associated with the count having the highest value, the improvement comprising:
the words in each word table are selected based on frequency of occurrence in a candidate language so that each word table covers an equivalent percentage of the associated candidate language.

16. A computer program product on a computer readable medium for identifying a language in which a computer document is written, comprising:
a plurality of word tables, each word table associated with and containing a selection of most frequently used words in a respective candidate language;
means for comparing a plurality of words from the document to the words in the word tables;
means for accumulating a respective count for each candidate language each time one of the plurality of words from the document is present in the associated word table; and
means for identifying the language of the document as the language associated with the count having the highest value.

17. The product as recited in claim 16 further comprising:
means for scanning a plurality of documents in each candidate language;

means for counting each of a plurality of words in the documents to establish a frequency of occurrence value for each word in each candidate language;

means for storing candidate words having a frequency of occurrence value exceeding a threshold value in each candidate language; and means for selecting among the candidate words and storing the selected words to form word tables for each of the candidate languages so that each word table covers a substantially equivalent percentage of the associated candidate language.

18. The product as recited in claim 16, wherein the frequency of occurrence of each word in each word table is stored in the word table and further comprises:

means for individually counting occurrences of each respective word in the word tables in the document;

means for counting a total number of words in the plurality of words compared to words in the word tables;

means responsive to the total number of compared words being less than a predetermined number for multiplying the individual count of each word by the stored frequency of occurrence for the word in the word table to produce a set of weighted counts and for summing the set of weighted counts to produce an aggregate weighted count once the plurality of words have been compared to the word tables; and means responsive to the total number of compared words being at least the predetermined number for summing the counts in each set of accumulators.

19. The product as recited in claim 16 which further comprises a set of word tables which represent genres within a candidate language.

20. The product as recited in claim 16, further comprising:

means for counting the number of words from the document compared to the words in the word tables; and means for stopping the comparing and accumulating means once a predetermined number of words from the target document are compared to the words in the word tables.

\* \* \* \* \*